(12) United States Patent
Lotz et al.

(10) Patent No.: US 9,143,628 B2
(45) Date of Patent: Sep. 22, 2015

(54) QUALITY CHECKS FOR PRINTED PAGES USING TARGET IMAGES THAT ARE GENERATED EXTERNAL TO A PRINTER

(75) Inventors: Michael Lotz, Longmont, CO (US); Carl Dennison, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 399 days.

(21) Appl. No.: 13/591,072

(22) Filed: Aug. 21, 2012

(65) Prior Publication Data
US 2014/0056484 A1  Feb. 27, 2014

(51) Int. Cl.
*G06K 9/00* (2006.01)
*H04N 1/00* (2006.01)

(52) U.S. Cl.
CPC ............ *H04N 1/00* (2013.01); *H04N 1/0005* (2013.01); *H04N 1/00047* (2013.01); *H04N 1/00074* (2013.01)

(58) Field of Classification Search
None
See application file for complete search history.

(56) References Cited

U.S. PATENT DOCUMENTS

| | | | |
|---|---|---|---|
| 6,335,978 B1 * | 1/2002 | Moscato et al. | 382/112 |
| 7,202,960 B2 | 4/2007 | Nagashige | |
| 7,697,850 B2 | 4/2010 | Mathewson | |
| 7,864,349 B2 | 1/2011 | Braudaway | |
| 8,159,700 B2 * | 4/2012 | Muramatsu | 358/1.15 |
| 2006/0238780 A1 | 10/2006 | Dennison | |
| 2008/0307233 A1 | 12/2008 | Calman | |
| 2010/0195139 A1 * | 8/2010 | Fransazov et al. | 358/1.15 |
| 2010/0266163 A1 | 10/2010 | Evevsky | |
| 2011/0007343 A1 | 1/2011 | Hopper | |
| 2011/0007350 A1 | 1/2011 | Chung | |
| 2011/0095078 A1 | 4/2011 | Price et al. | |
| 2011/0096349 A1 * | 4/2011 | Braudaway | 358/1.14 |
| 2011/0096367 A1 | 4/2011 | Walp | |

(Continued)

FOREIGN PATENT DOCUMENTS

| | | |
|---|---|---|
| CA | 2718036 | 4/2011 |
| CN | 1959623 A | 5/2007 |

(Continued)

OTHER PUBLICATIONS

Creative Commons Attribution, "Advanced Function Presentation", Wikipedia, Available online at http://en.wikipedia.org/wiki/Advanced_Function_Presentation, Date Accessed Feb. 24, 2015, Internet Archive Capture dated Jan. 23, 2011, https://web.archive.org/web/20110123104635/http://en.wikipedia.org/wiki/Advanced_Function_Presentation.*

(Continued)

*Primary Examiner* — Tahmina Ansari
(74) *Attorney, Agent, or Firm* — Duft Bornsen & Fettig LLP

(57) ABSTRACT

Systems and methods are provided for ensuring that printed output for a print job matches the expected output for a print job. The system comprises a control unit and a comparison unit. The control unit receives a print job and modifies the print job by adding a tag to each logical page of the print job, and to transmit the modified print job to a printer. The control unit further generates target images for the logical pages of the print job. The comparison unit receives printed pages of the job from the printer. For each printed page of the job, the comparison unit identifies a tag on the printed page, identifies a target image corresponding with the tag on the printed page, and compares an image of the printed page to the target image to detect discrepancies between the printed page and the target image.

20 Claims, 5 Drawing Sheets

(56) References Cited

U.S. PATENT DOCUMENTS

| | | | |
|---|---|---|---|
| 2011/0141495 A1* | 6/2011 | Kuo et al. | 358/1.8 |
| 2011/0149331 A1* | 6/2011 | Duggan et al. | 358/1.14 |
| 2011/0149336 A1 | 6/2011 | Price | |
| 2012/0105904 A1 | 5/2012 | Otey | |
| 2013/0293923 A1* | 11/2013 | Fisher et al. | 358/1.15 |
| 2014/0056484 A1* | 2/2014 | Lotz et al. | 382/112 |

FOREIGN PATENT DOCUMENTS

| | | | |
|---|---|---|---|
| EP | 2280366 A1 | 2/2011 | |
| JP | 2007128500 A | 5/2007 | |
| JP | 2011019225 A | 1/2011 | |

OTHER PUBLICATIONS

Motwani et al, "Collocated Dataglyphs for Large Message Storage and Retrieval" Security, Steganography, and Watermarking of Multimedia Contents VI, edited by Edward J. Delp III, Ping W. Wong, Proc. of SPIE-IS&T Electronic Imaging, SPIE vol. 5306 © 2004 SPIE and IS&T • 0277-786X/04.

"An IBM and Videk solution for printing U.S. Federal Government Checks" © International Business Machines Corporation 2001, IBM Printing Systems, Boulder, CO 80301-9191.
U.S. Appl. No. 13/311,772, application as filed.

* cited by examiner

QUALITY CHECKS FOR PRINTED PAGES USING TARGET IMAGES THAT ARE GENERATED EXTERNAL TO A PRINTER

FIELD OF THE INVENTION

The invention relates to the field of printing, and in particular, to systems capable of verifying that printed output from a printer matches an expected printed output.

BACKGROUND

In the field of printing systems, printers may unexpectedly generate small stray marks (or even missing marks) when printing incoming jobs. Depending upon the size of these marks, as well as the nature of the print job, the stray marks may or may not be acceptable to a customer. For example, a small stray mark in one of several thousand copies of a newspaper may be inconsequential, while a small stray mark on a dense technical manual may change the appearance and overall interpretation of an important piece of code or formula. Unfortunately, stray marks can be extremely small (e.g., 1/75th of an inch), which makes manually reviewing a printed job for errors an extremely tedious process. Furthermore, a manual review of the printed pages of an incoming job is unlikely to catch every error. Thus, important print jobs for a customer that are manually reviewed may still be subject to an undesirable level of error when they are delivered.

To address these problems, print shops may include print verification systems. Print verification systems are printing systems that automatically review the output of printers to ensure that they are consistent with quality standards. For example, print verification systems may be used to ensure that no stray marks (or missing marks) appear on printed pages of an incoming job, to ensure that colors printed for a job match their expected hues and saturations, and/or to perform other operations. Print verification systems are particularly useful in ensuring that printed pages meet rigorous quality standards expected for mission critical print jobs.

Currently, print verification systems utilize a printer that receives a print job from a print server. The logical pages of the job are rasterized at the printer in order to generate bitmap versions of each incoming logical page. The rasterized logical pages are then printed at the printer. Furthermore, each rasterized logical page is sent from the printer to a comparison unit, which uses the rasterized logical pages as target images that show an expected printing output. The comparison unit images each printed page and compares it to a corresponding target image from the printer. If there is an error in printing, the comparison unit may then report this result. An example of an existing print verification system is described in U.S. Pat. No. 7,864,349 which is herein incorporated by reference.

SUMMARY

Embodiments described herein enhance existing print verification systems by generating verification data (e.g., target images) used to ensure that pages of print jobs are printed in accordance with the expectations of a customer. In particular, these embodiments describe verification data generated at a control unit that is external to a printer. The control unit provides the verification data to a comparison unit, and the comparison unit compares the printed pages of incoming jobs against an expected output indicated in the verification data.

Generating tag information and target images at a distinct control unit (e.g., a print server, workflow management system, etc.) provides a variety of benefits. First, this eliminates the need to generate verification data at a printer while an incoming job is being printed, which in turn reduces processing load at the printer. Second, the verification data can be generated by the verification system at any time before or after the actual printing of the job, which helps to enhance the flexibility of the print verification system. Third, generating verification data at a device external to a printer frees the print verification system from being tied down to a specific model of printer. This also eliminates the need for special processing logic at the printer, as well as the need for high-speed interfaces to transfer target images from the printer to a comparison unit.

One embodiment is a system that includes a control unit and a comparison unit. The control unit is able to receive a print job, to modify the print job by adding a tag to each logical page of the print job, and to transmit the modified print job to a printer. The control unit is further able to generate target images for the logical pages of the print job. The comparison unit is able to receive printed pages of the job from the printer. For each printed page of the job, the comparison unit is further able to identify a tag on the printed page, identify a target image corresponding with the tag on the printed page; and compare an image of the printed page to the target image to detect discrepancies between the printed page and the target image.

Another embodiment is a method for verifying printed output. The method includes receiving a print job at a control unit of a printing system, modifying the print job by adding a tag to each logical page of the job at the control unit, and transmitting the modified print job from the control unit to a printer. The method also includes generating target images for the logical pages of the print job at the control unit. Further, the method includes receiving printed pages of the job from the printer at a comparison unit. For each printed page, the method further includes identifying a tag on the printed page, identifying a target image corresponding with the tag on the printed page, and comparing an image of the printed page to the target image to detect discrepancies between the printed page and the target image.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
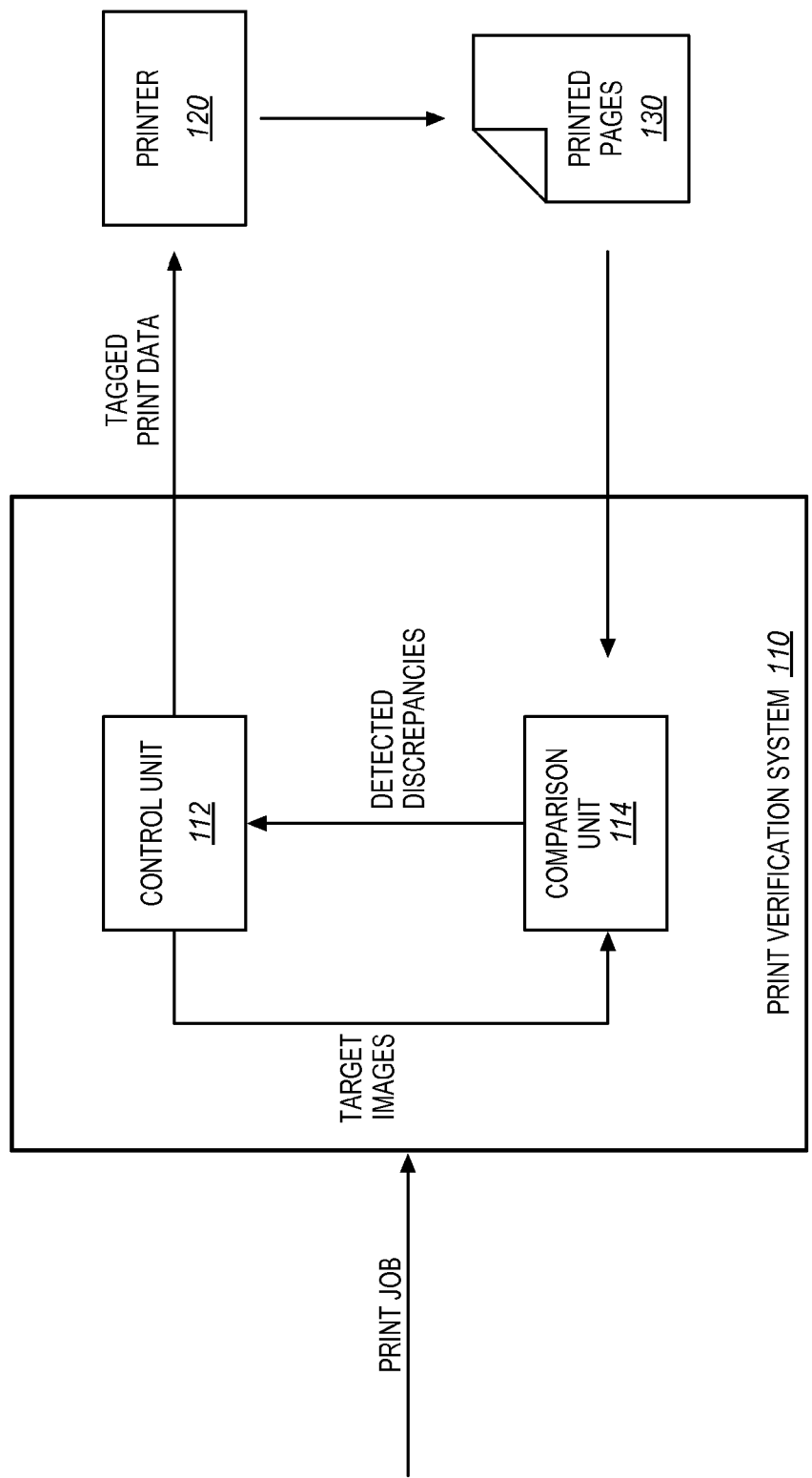
FIG. 1 is a block diagram of a print verification system in an exemplary embodiment.

FIG. 1 is a block diagram of a print verification system 110 in an exemplary embodiment. Print verification system 110 comprises any system, component, or device operable to verify that print jobs have been printed correctly. In this embodiment, print verification system 110 includes control unit 112 and comparison unit 114, which interact with printer 120 as it generates printed pages 130. Print verification system 110 provides a benefit over prior verification systems, because control unit 112 of print verification system 110, which is a distinct and separate entity from printer 120, may generate target images for each logical page in a print job, as well as tagging information added to each logical page. This frees printer 120 from having to perform such tasks, and therefore eliminates the prior need for specialized printers capable of communicating with a comparison unit.

Control unit 112 comprises any system, device, or component operable to receive and process incoming print jobs. For example, control unit 112 may comprise a print server, a workflow control system, etc. Control unit 112 may be implemented, for example, as custom circuitry, as a special or general purpose processor executing programmed instructions stored in an associated program memory, or some combination thereof.

Printer 120 comprises any system, component, or device operable to mark media in accordance with print data received from control unit 112. For example, printer 120 may comprise a continuous-forms production printer, a desktop printer, a stamping/cutting apparatus, etc.

Comparison unit 114 comprises any system, component, or device operable to compare printed pages 130 against target images received from control unit 112. For example, comparison unit 114 may include a camera in order to capture images of incoming printed pages, and may include a processor capable of matching captured images to target images stored in memory. Once a match has been made, comparison unit 114 may determine if there are any discrepancies (e.g., stray or missing marks) between the printed pages and the target images.

Further details of the operation of print verification system 110 will be discussed with regard to FIG. 2. Assume, for this embodiment, that print verification system 110 is idle and awaiting a new print job for processing.

Figure 2:
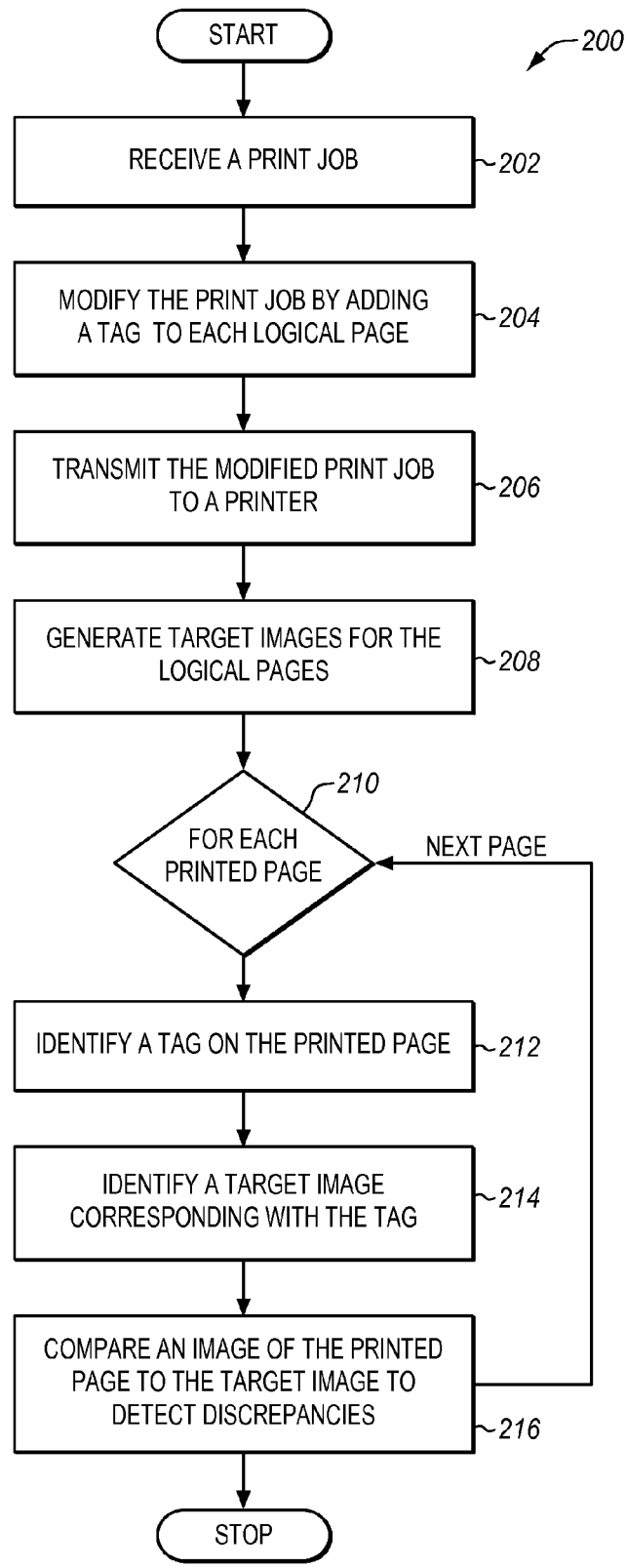
FIG. 2 is a flowchart illustrating a method for utilizing a print verification system in an exemplary embodiment.

FIG. 2 is a flowchart illustrating a method 200 for utilizing a print verification system in an exemplary embodiment. The steps of method 200 are described with reference to print verification system 110 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, control unit 112 of print verification system 110 receives a print job. The print job may be defined, for example, according to a Page Description Language (PDL) such as Portable Document Format (PDF), may be defined in an Advanced Function Presentation (AFP) datastream, etc. The received print job includes logical pages of print data that are subject to print verification. Often, the entire print job will be subject to verification, although in some embodiments, a selection of pages of the print job will be chosen for verification (e.g., as indicated by a job ticket for the print job, or as selected by control unit 112).

In step 204, control unit 112 modifies the print job by adding a tag to each logical page. Each tag comprises printable data that distinguishes a printed page from other printed pages of the job. Thus, when the tags are printed, the tags are visible on the printed pages and may be used to identify the pages (e.g., by page number and/or copy number). The tags may be implemented as PDL data or as rasterized data, and may comprise barcodes, symbols, text, etc.

In step 206, control unit 112 transmits the modified print job to printer 120. The transmitted data may be an AFP print stream, PDL print data, a rasterized version of the print job, etc. If rasterized data is transmitted, an appropriate high-speed interface may be used.

In step 208, control unit 112 generates target images for the logical pages in the job (e.g., a target image for each logical page). Each target image may comprise, on a pel-by-pel basis, the expected printed output of the print job. For example, a target image may comprise a rasterized bitmap image of a logical page or a portion thereof. Control unit 112 may further associate each tag with a target image, so that printed pages of the job can be compared with specific target images. If the print job includes multiple copies of the same logical page, it may be appropriate to associate the each tag for a duplicate logical page with the same target image in order to reduce the number of target images. This in turn saves processing time as well as space in memory.

When printer 120 receives the print job, printer 120 proceeds to initiate printing of the job in its modified form. Thus, each printed page includes a tag added by control unit 112. As the printed pages are generated, they are taken to comparison unit 114 (e.g., they travel along a web of continuous media downstream towards comparison unit 114).

In step 210, comparison unit 114 analyzes each printed page. This may include, for example, imaging the printed page. In step 212, the analysis includes identifying a tag on the printed page. In step 214, the analysis includes identifying a target image that corresponds with the tag for the page. For example, comparison unit 114 may take a picture of the printed page, and may review the picture to identify and process the tag included within. The tag may further be reviewed to determine the page number (and/or copy number) is currently under review. Based on the page number (and/or copy), a corresponding target image may be acquired. Once a target image has been associated with a printed page, comparison unit 114 may compare an image of the printed page with the corresponding target image to detect discrepancies between the printed page and the target image (i.e., differences between the expected and actual output of the print job) in step 216.

A discrepancy may comprise a missing mark, a stray mark, a difference in hue, or another feature unexpected during the printing process. Discrepancies may be defined for comparison unit 114 such that only certain types of differences are considered worthy of reporting. For example, small differences in hue, or very small stray marks may intentionally be ignored by comparison unit 114.

If a discrepancy has been detected, comparison unit 114 may further report the discrepancies to control unit 112 (e.g., for later presentation to a user), and may further provide thumbnail images indicating how each detected visual discrepancy appears on the page.

Using method 200 described above, a print verification system can be used that does not require any form of specialized printer. Tags and target images are generated at a control unit instead of a printer, which in turn reduces the cost of any printer used by the print verification system. For example, the printers utilized above do not require high-speed data transfer interfaces to send their information to a comparison unit, and further do not require specialized internal logic defining how to add tags to each page of received print data.

In a further embodiment, control unit 112 may determine (e.g., by analyzing a job ticket for the print job) portions of printed pages that will be removed after printing (e.g., by cutting). Control unit 112 may further decide to place the tags in these locations, so that evidence of the print verification process is hidden from the customer. Control unit 112 may further use a larger sheet size than requested for the print job by a customer, may print the tags on the excess portions of these sheets, and may instruct various print shop devices (e.g., via a job ticket) to remove the excess portions of the sheets after printing and verification has been performed for the job.

EXAMPLES

In the following examples, additional processes, systems, and methods are described in the context of a print verification system capable of detecting discrepancies between the expected and actual output of incoming print jobs.

Figure 3:
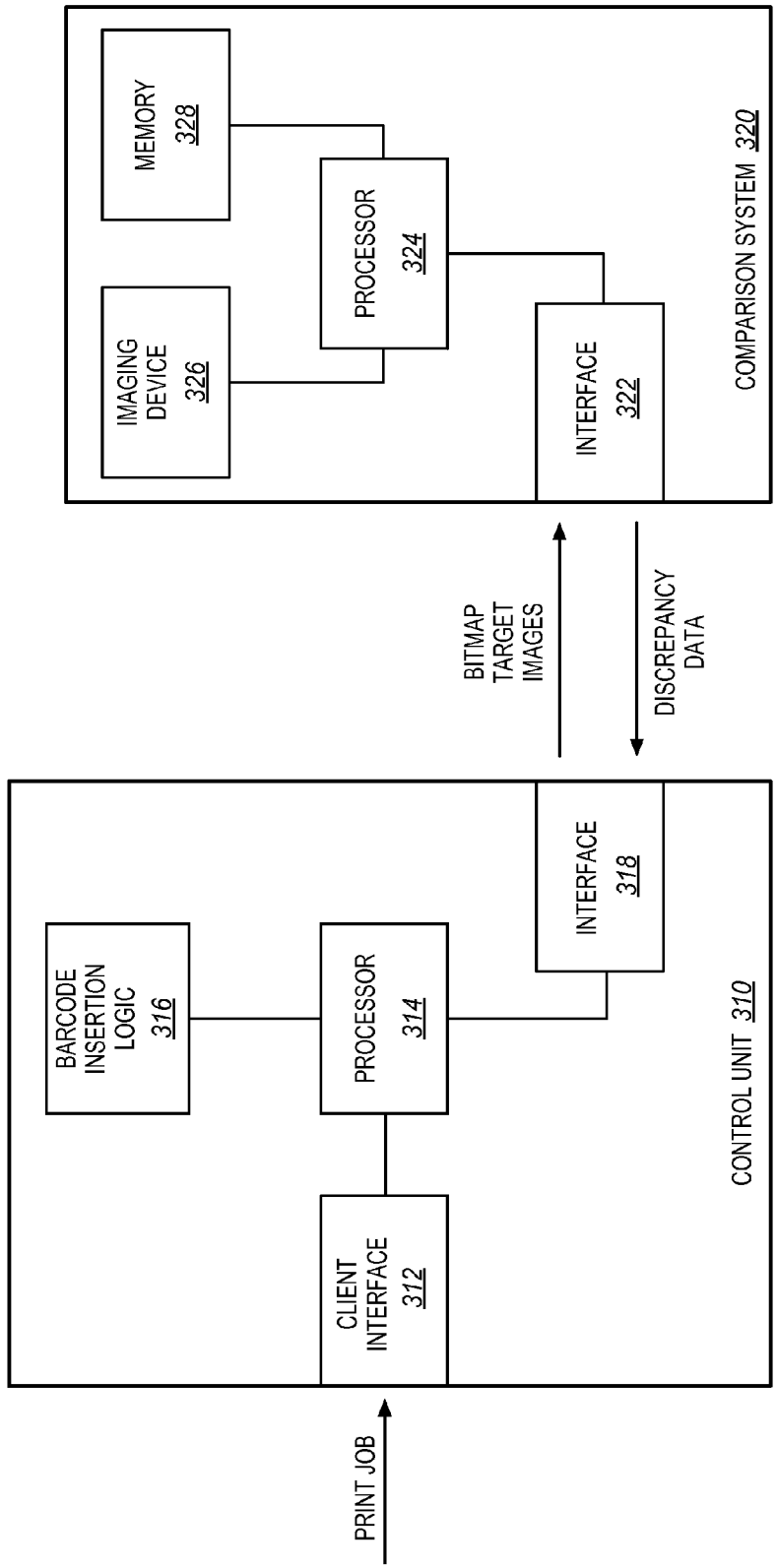
FIG. 3 is a block diagram illustrating additional details of a control unit and a comparison unit in an exemplary embodiment.

FIG. 3 is a block diagram illustrating additional details of a control unit 310 and a comparison unit 320 in an exemplary embodiment. In this example, control unit 310 includes client interface 312, which is an Ethernet interface that receives incoming PDL encoded print jobs (e.g., Postscript or PDF). Print jobs received from client interface 312 are received by processor 314. Processor 314 consults barcode insertion logic 316 within a memory of control unit 310, and proceeds to modify received print jobs by adding a barcode (i.e., a tag) within the PDL data defining each received page. The barcode defines the page number and copy number for each page. For example, if a large number of copies are being generated, then a barcode may define one page as "Page 5, Copy 1," and may define another page as "Page 5, Copy 7." Additionally, control unit 310 adds tag information in the form of size and scaling marks (e.g., rulers located at the borders of the print job and used to determine expansion or contraction of the page due to heating and physical stresses during or after printing). When adding the scaling marks and/or barcode, control unit 310 may review the print job (e.g., a job ticket) to determine portions of the print job that will be cut during post-processing. Control unit 310 may then add the scaling marks and/or barcodes in these regions.

Once barcodes have been applied to pages of the print data, processor 314 uses an interface (not shown) to transmit an AFP datastream of the modified print job to a continuous-forms production printer. The printer, interpreting the incoming AFP datastream, prints each incoming page of print data onto continuous print media.

Processor 314 also generates rasterized bitmap target images of each logical page, but does not generate multiple rasterized images for duplicate pages. For example, if a print job indicates that seven copies should be printed, processor 314 generates a rasterized version of each page of a single copy. Processor 314 then accesses an internal memory, and associates each rasterized image with tags for one or more pages (e.g., using a table, database, etc.). The rasterized images and the data that associates tags with rasterized images are then transmitted to comparison unit 320 over a high-speed serial link implemented by interface 318.

Comparison unit 320 is located downstream of the production printer, and receives a web of print media that includes the printed pages of the job. Comparison unit 320 includes imaging device 326, which utilizes two cameras. Each camera takes pictures of a different side of the incoming media, and the cameras transmit these pictures to separate Central Processing Units (CPUs) of processor 324. Each CPU retrieves the pictures and identifies a barcode located on each picture (e.g., based on an expected location or shape of the barcode on the page). Based on the barcode (e.g., based on page number) a corresponding target image can be found for the printed page.

Each CPU further analyzes the scaling marks on the incoming printed pages. Based on the manner in which the scaling marks have been warped due to stretching or contraction, each CPU is capable of generating a revised picture of the printed output so that it can be compared to a target image.

The target image is then compared to the revised picture, and the CPU checks for discrepancies that are defined according to internal criteria. In this example, a discrepancy comprises any stray marks or missing marks that are eight pels in size or larger on a print job that is printed at 600 pels per inch resolution. As determinations are being made at comparison unit 320, interface 322 is utilized by processor 324 to report back any detected discrepancies in the printed output. The discrepancies are reported by page and copy number, and each noted discrepancy is accompanied by an image that shows the discrepancy as it appears on the printed page. This information is received at control unit 310, which reports the information (and associated images) back to a user via a user interface (e.g., a display and associated input devices). Once the discrepancies have been determined, the printed output is cut so that the scaling marks are removed from the final version of the print job.

Figure 4:
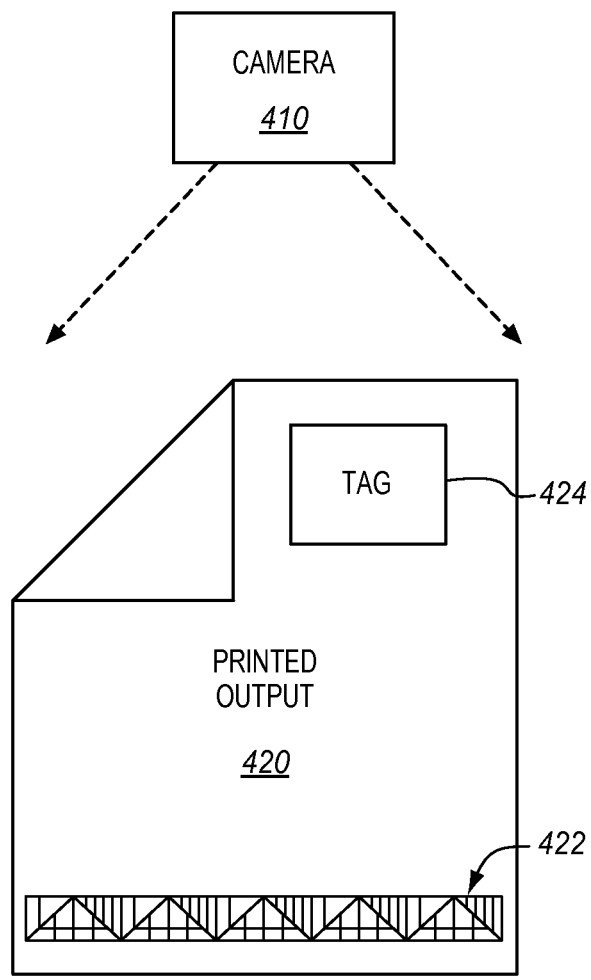
FIG. 4 is a block diagram of a camera imaging a printed page in an exemplary embodiment.

FIG. 4 is a block diagram of a camera 410 taking a picture of printed output 420 in an exemplary embodiment. In this example, camera 410 images one side of printed output 420 which resides on a web of print media as it travels across one or more rollers. Pictures taken by camera 410 include tag 424, which comprises a 1D or 2D barcode, and also include scaling marks 422.

Figure 5:
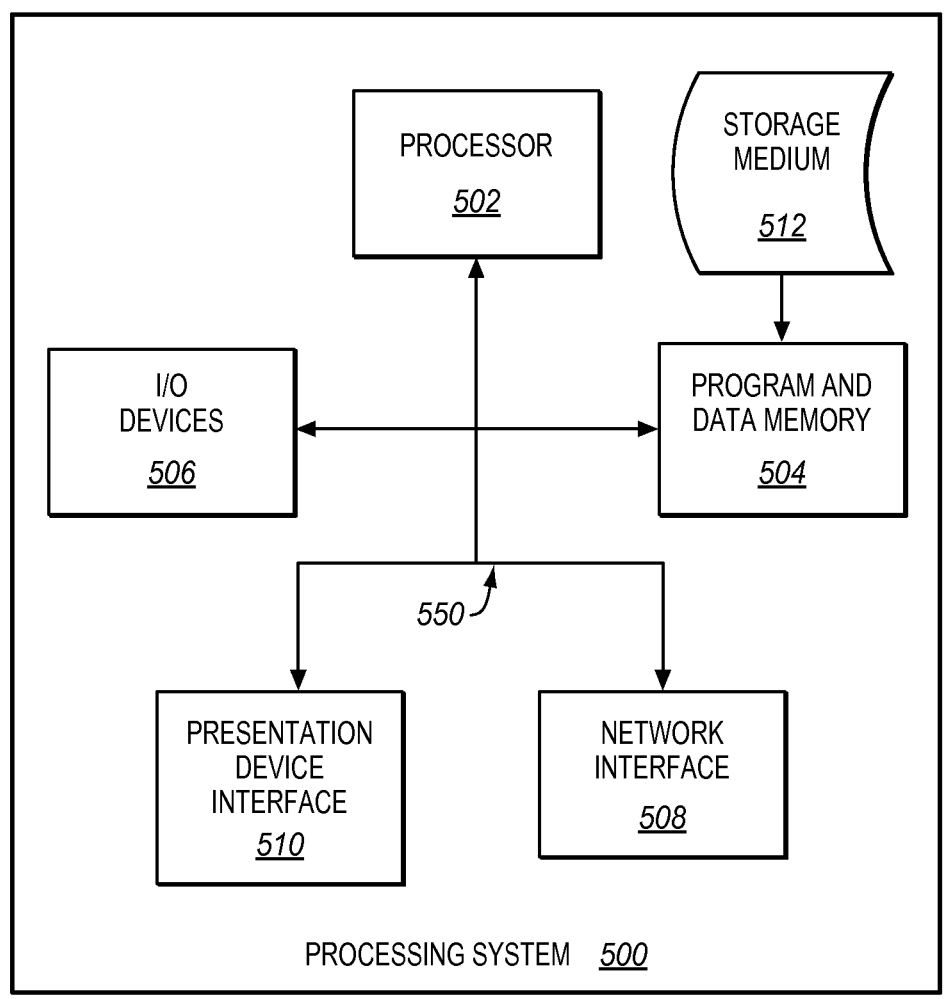
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print verification system 110 to perform the various operations disclosed herein. FIG. 5 illustrates a processing system 500 operable to execute a computer readable medium embodying programmed instructions to perform desired functions in an exemplary embodiment. Processing system 500 is operable to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 may also be integrated with the system to enable processing system 500 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be integrated with the system to interface to one or more presentation devices, such as printing systems and displays for presentation of presentation data generated by processor 502.

Although specific embodiments were described herein, the scope of the invention is not limited to those specific embodiments. The scope of the invention is defined by the following claims and any equivalents thereof.

We claim:

1. A system comprising:
a control unit operable to receive a print job, to modify the print job by adding a tag to each logical page of the print job, and to transmit the modified print job to a printer,
the control unit further operable to generate target images for the logical pages of the print job, and to generate scaling marks at borders of the logical pages of the print job; and
a comparison unit operable to receive printed pages of the job from the printer, and for each printed page of the job, to:
identify a tag on the printed page;
identify a target image corresponding with the tag on the printed page; and
compare an image of the printed page to the target image to detect discrepancies between the printed page and the target image,
wherein the comparison unit is further operable to analyze scaling marks on the printed page to determine changes in page shape, and to generate the image of the printed page by revising a scanned version of the printed page based on the determined changes in page shape, and wherein the scaling marks on the printed page indicate expansion or contraction of the printed page due to heating and physical stresses applied to the printed page.

2. The system of claim 1 wherein:
the control unit is further operable to transmit the modified print job to the printer as an Advanced Function Presentation (AFP) datastream.

3. The system of claim 1 wherein:
the control unit is further operable to insert scaling marks at locations which will be cut from the printed page during post-processing.

4. The system of claim 1 wherein:
the comparison unit is further operable to detect discrepancies on a printed page where a group of printed pels does not match a group of expected pels defined in a target image.

5. The system of claim 1 wherein:
the control unit comprises a print server coupled with the printer and the comparison unit.

6. The system of claim 1 wherein:
the control unit is further operable to add the tags to a portion of each logical page that will be removed from corresponding printed pages of the print job after printing.

7. The system of claim 1 wherein:
the control unit is further operable to receive information from the comparison unit indicating the discrepancies, and to generate a prompt at a user interface informing a user of the detected discrepancies.

8. A method comprising:
receiving a print job at a control unit of a printing system;
modifying the print job by adding a tag to each logical page of the job at the control unit;
transmitting the modified print job from the control unit to a printer;
generating target images for the logical pages of the print job at the control unit;
receiving printed pages of the job from the printer at a comparison unit; and
for each printed page:
identifying a tag on the printed page;
identifying a target image corresponding with the tag on the printed page;
comparing an image of the printed page to the target image to detect discrepancies between the printed page and the target image;
analyzing scaling marks on the printed page to determine changes in page shape, wherein the scaling marks on the printed page indicate expansion or contraction of the printed page due to heating and physical stresses applied to the printed page; and
generating the image of the printed page by revising a scanned version of the printed page based on the determined changes in page shape.

9. The method of claim 8 wherein modifying the print job comprises:
transmitting the modified print job to the printer as an Advanced Function Presentation (AFP) datastream.

10. The method of claim 8 further comprising:
inserting scaling marks at locations which will be cut from the printed page during post-processing.

11. The method of claim 8 wherein comparing the image of the printed page to the target image comprises:
detecting discrepancies on the printed page where a group of printed pels does not match a group of expected pels defined in the target image.

12. The method of claim 8 wherein:
the control unit comprises a print server coupled with the printer and the comparison unit.

13. The method of claim 8 wherein modifying the print job comprises:
adding the tags to a portion of each logical page that will be removed from corresponding printed pages of the print job after printing.

14. The method of claim 8 further comprising:
receiving information from the comparison unit indicating the discrepancies detected at the control unit; and generating a prompt at a user interface of the control unit informing a user of the detected discrepancies.

15. A non-transitory computer readable medium embodying programmed instructions which, when executed by a processor, are operable for performing a method comprising:
receiving a print job at a control unit of a printing system;
modifying the print job by adding a tag to each logical page of the job at the control unit;
transmitting the modified print job from the control unit to a printer;
generating target images for the logical pages of the print job at the control unit;
receiving printed pages of the job from the printer at a comparison unit; and
for each printed page:
identifying a tag on the printed page;
identifying a target image corresponding with the tag on the printed page;
comparing an image of the printed page to the target image to detect discrepancies between the printed page and the target image;
analyzing scaling marks on the printed page to determine changes in page shape, wherein the scaling marks on the printed page indicate expansion or contraction of the printed page due to heating and physical stresses applied to the printed page; and
generating the image of the printed page by revising a scanned version of the printed page based on the determined changes in page shape.

16. The medium of claim 15 wherein modifying the print job comprises:
transmitting the modified print job to the printer as an Advanced Function Presentation (AFP) datastream.

17. The medium of claim 15 further comprising:
inserting scaling marks at locations which will be cut from the printed page during post-processing.

18. The medium of claim 15 wherein comparing the image of the printed page to the target image comprises:
detecting discrepancies on the printed page where a group of printed pels does not match a group of expected pels defined in the target image.

19. The medium of claim 15 wherein:
the control unit comprises a print server coupled with the printer and the comparison unit.

20. The medium of claim 15 wherein modifying the print job comprises:
adding the tags to a portion of each logical page that will be removed from corresponding printed pages of the print job after printing.

\* \* \* \* \*